US007181218B2

(12) United States Patent
Ovesjo et al.

(10) Patent No.: US 7,181,218 B2
(45) Date of Patent: Feb. 20, 2007

(54) COMMANDING HANDOVER BETWEEN DIFFERING RADIO ACCESS TECHNOLOGIES

(75) Inventors: Fredrik Ovesjo, Stockholm (SE); Himke Van Der Velde, Zwolle (NL)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 621 days.

(21) Appl. No.: 10/116,129

(22) Filed: Apr. 5, 2002

(65) Prior Publication Data

US 2002/0160785 A1    Oct. 31, 2002

Related U.S. Application Data

(60) Provisional application No. 60/282,486, filed on Apr. 10, 2001.

(51) Int. Cl.
*H04Q 7/20* (2006.01)

(52) U.S. Cl. .................. 455/436; 455/437; 455/426.1; 455/450; 455/419; 370/321

(58) Field of Classification Search ........ 455/436–444, 455/426.1, 550.1, 552.1, 450, 418–420; 370/331, 370/328
See application file for complete search history.

(56) References Cited

U.S. PATENT DOCUMENTS 4,692,945 A    9/1987  Zdunek (Continued)

FOREIGN PATENT DOCUMENTS

EP    0 715 423 A    6/1996

(Continued)

OTHER PUBLICATIONS

3GPP TS 25.331 V3.6.0 (Mar. 2001) Technical Specification 3rd Generation Partnership Project; Technical Specification Group Radio Access Network RRC Protocol Specification (Release 1999); pp. 144-152.*

(Continued)

*Primary Examiner*—George Eng
*Assistant Examiner*—Marcos L. Torres
(74) *Attorney, Agent, or Firm*—Nixon & Vanderhye, P.C.

(57) ABSTRACT

A dual mode mobile terminal (30) is capable of communicating (e.g., with a core network) either via a first radio access network (12) having a first type radio access technology (GSM) or a second radio access network (14) having a second type radio access technology (UTRAN). When conditions warrant, a network node prepares a radio access technology (RAT) handover message for transmission to the equipment unit (UE) in conjunction with handover of the mobile terminal (MT) from the first radio access network to the second radio access network, and an associated change of operation mode of the mobile terminal (MT) from the first mode to the second mode. In accordance with the present invention, a radio access technology handover message includes a first information element representative of a first parameter from which a value of a second parameter can be derived so that the second parameter need not be included as a separate information element in the radio access technology handover message. Not including the second parameter as a separate element in the radio access technology handover message facilitates non-segmentation of the radio access technology handover message. In one aspect of the invention, the radio access technology handover message is a RRC Handover to UTRAN message; the first parameter is a Serving-Radio Network Temporary Identifier (S-RNTI 2); and, the second parameter is an information element which facilitates distribution of load and transmission of traffic in the radio access network (e.g., a Default DPCH Offset Value).

17 Claims, 4 Drawing Sheets

U.S. PATENT DOCUMENTS

| | | | |
|---|---|---|---|
| 5,063,494 | A | 11/1991 | Davidowski et al. |
| 5,164,938 | A | 11/1992 | Jurkevich et al. |
| 5,241,685 | A | 8/1993 | Bodin et al. |
| 5,267,261 | A | 11/1993 | Blakeney, II et al. |
| 5,379,404 | A | 1/1995 | Rasor |
| 5,404,355 | A | 4/1995 | Raith |
| 5,457,780 | A | 10/1995 | Shaw et al. |
| 5,487,174 | A | 1/1996 | Persson |
| 5,574,728 | A | 11/1996 | Mamaghani et al. |
| 5,594,718 | A | 1/1997 | Weaver, Jr. et al. |
| 5,596,315 | A | 1/1997 | Olds et al. |
| 5,634,192 | A | 5/1997 | Meche et al. |
| 5,640,414 | A | 6/1997 | Blakeney, II et al. |
| 5,673,259 | A | 9/1997 | Quick |
| 5,697,055 | A | 12/1997 | Gilhousen et al. |
| 5,697,097 | A | 12/1997 | Reibel et al. |
| 5,706,290 | A | 1/1998 | Shaw et al. |
| 5,715,419 | A | 2/1998 | Szczepanek et al. |
| 5,740,239 | A | 4/1998 | Bhagat et al. |
| 5,767,833 | A | 6/1998 | Vanderwiele et al. |
| 5,774,465 | A | 6/1998 | Lau et al. |
| 5,778,316 | A | 7/1998 | Persson et al. |
| 5,825,774 | A | 10/1998 | Ready et al. |
| 5,826,017 | A | 10/1998 | Holzmann |
| 5,838,226 | A | 11/1998 | Houggy et al. |
| 5,848,063 | A | 12/1998 | Weaver, Jr. et al. |
| 5,870,673 | A | 2/1999 | Haartsen |
| 5,878,033 | A | 3/1999 | Mouly |
| 5,903,832 | A | 5/1999 | Seppanen et al. |
| 5,929,776 | A | 7/1999 | Warble et al. |
| 5,943,332 | A | 8/1999 | Liu et al. |
| 5,995,836 | A | 11/1999 | Wijk et al. |
| 5,999,811 | A | 12/1999 | Mölne |
| 6,002,940 | A | 12/1999 | Richter |
| 6,006,077 | A | 12/1999 | Shull |
| 6,078,570 | A | 6/2000 | Czaja et al. |
| 6,088,588 | A | 7/2000 | Osborne |
| 6,091,949 | A | 7/2000 | Sanchez |
| 6,111,864 | A | 8/2000 | Kabasawa |
| 6,128,490 | A | 10/2000 | Shaheen et al. |
| 6,138,034 | A | 10/2000 | Willey |
| 6,289,009 | B1 | 9/2001 | Sato |
| 6,549,779 | B1 * | 4/2003 | Muller et al. .......... 455/439 |
| 6,725,039 | B1 * | 4/2004 | Parmar et al. .......... 455/436 |
| 6,782,274 | B1 * | 8/2004 | Park et al. .......... 455/552.1 |
| 2002/0025815 | A1 * | 2/2002 | Rune et al. .......... 455/436 |
| 2003/0003895 | A1 * | 1/2003 | Wallentin et al. .......... 455/410 |
| 2004/0087299 | A1 * | 5/2004 | Vallinen et al. .......... 455/405 |

FOREIGN PATENT DOCUMENTS

| | | |
|---|---|---|
| EP | 0 854 588 A | 7/1998 |
| EP | 0 858 393 A | 7/1998 |
| EP | 0 888 026 A2 | 12/1998 |
| EP | 0 946 076 A | 9/1999 |
| EP | 0 948 231 A | 10/1999 |
| FR | 2 790 632 A | 9/2000 |
| JP | 10-155173 A | 6/1998 |
| WO | 98/06226 A2 | 2/1998 |
| WO | 98/28931 A | 2/1998 |
| WO | 98/51103 | 11/1998 |
| WO | 98/58461 A | 12/1998 |
| WO | 99/43177 A1 | 8/1999 |
| WO | 99/43178 A1 | 8/1999 |
| WO | 00/36867 | 6/2000 |
| WO | 00/41429 | 7/2000 |
| WO | 01/01602 A1 | 1/2001 |
| WO | 01/20942 A1 | 3/2001 |
| WO | 01/54443 A2 | 7/2001 |

OTHER PUBLICATIONS

3GPP Technical Spec., "Universal Mobile Telecommunications System (UMTS)", ETSI TS 125 331, v.3.7.0., Jun. 2001, pp. 151-155, XP002902762 RRC Protocol Specification.

International Search Report mailed Nov. 6, 2002.

International Preliminary Examination Report mailed Apr. 14, 2003 in corresponding PCT Application No. PCT/SE02/00709.

U.S. Appl. No. 09/411,383, filed Oct. 4, 1999 entitled "Telecommunications Network Broadcasting of Service Capabilities".

3GPP TS 25.331, 3$^{rd}$ Generation Partnership Project; Technical Specification Group Radio Access Network; RRC Protocol Specification (Release 1999), V3.7.0 (Jun. 2001), pp. 7 and 151-164.

Technical Specification, 3$^{rd}$ Generation Partnership Project (3GPP); Technical Specification Group (TSG) Radio Access Network; Radio Resource Management Strategies, 3G TR 25.922, V3.0.0 (Dec. 1999).

U.S. Appl. No. 09/314,019, filed May 19, 1999, entitled "Mobile Station Measurements With Event-Based Reporting".

U.S. Appl. No. 09/344,122, filed Jun. 24, 1999, entitled "Network-Evaluated Handover Assisted By Both Mobile and Base-Stations".

U.S. Appl. No. 09/262,346, filed Mar. 4, 1999, entitled "Coordinating Different Types of Messages Sent To Mobile Radios In A Mobile Communications Systems".

Technical Specification, 3$^{rd}$ Generation Partnership Projection; Technical Specification Group Radio Access Netwrok; Physical Layer—Measurements (FDD) (3G TS 25.215 version 3.1.0), 1999.

Technical Specification, 3$^{rd}$ Generation Partnership Projection; Technical Specification Group Radio Access Network; Multiplexing and Channel Coding (FDD) (3G TS 25.212 version 3.1.0) 1999.

3GPP TS 25.331 v.3.6.0 (Mar. 2001), 3$^{rd}$ Generation Partnership Project, Technical Specification Group Radio Access Network; RRC Protocol Specification (Release 1999).

* cited by examiner

COMMANDING HANDOVER BETWEEN DIFFERING RADIO ACCESS TECHNOLOGIES

This application claims the priority and benefit of U.S. Provisional patent application No. 60/282,486, filed Apr. 10, 2001, which is incorporated herein by reference in its entirety.

BACKGROUND

1. Field of the Invention

The present invention pertains to wireless telecommunications, and particularly to inter-radio access technology handover for wireless telecommunications.

2. Related Art and Other Considerations

Some mobile terminals are capable of using more than one type of radio access technology (RAT) in order to communicate with, e.g., other mobile terminals or one or more core networks. Such mobile terminals have been termed as "dual mode" mobile terminals in view of their capability to use (e.g., at differing times) at least two radio access technology types. Each radio access technology type is implemented using an associated radio access subsystem or network. Two examples of differing radio access technologies are (1) the Global System for Mobile communications (GSM) developed in Europe, and its third generation successor (2) the Universal Mobile Telecommunications (UMTS) Terrestrial Radio Access Network (UTRAN). UTRAN is essentially a wideband code division multiple access (W-CDMA) system.

An inter-radio access technology (RAT) handover is process wherein a mobile terminal switches from using a first radio access system having a first radio access technology (such as GSM) to a second radio access system having a second radio access technology (such as UTRA). Inter-RAT handover is normally initiated when the quality of a downlink radio connection of the first radio access network falls below a certain level. The quality of the uplink connection with the first radio access network may be considerably poorer than the downlink quality.

In the inter-RAT procedure, a handover command message is sent to the mobile terminal to provide the mobile terminal with details of the radio resources to be used after the handover (e.g., when the mobile terminal is in communication with the second radio access network using the second radio access technology). As an example, consider a situation in which the first radio access network with which a mobile terminal has been communicating uses GSM radio access technology (RAT), and wherein measurements warrant that the dual mode mobile terminal change to use UTRA radio access technology. In such situation, the handover command message that is sent by a base station controller of the GSM radio access network across the GSM air interface to the mobile station comprises one or more segments of limited length (each segment being twenty one octets). When a segment of twenty one octets is insufficient to transmit the radio resource information necessary for the handover, the handover command message must be segmented to comprise plural segments. However, after a segment of the handover command message is sent, a subsequent segment cannot be transferred until receipt of the preceding segment has been acknowledged.

The handover command message is sent from the base station controller to the mobile terminal via the downlink radio connection. However, in a case in which the handover command message is segmented, successful transfer of the handover command message requires that acknowledgement of a preceding segment be transferred via the uplink radio connection prior to transmission of a further segment. Thus, if segmentation is used, it may be impossible to quickly transfer the handover command message due to poor quality of the uplink radio connection. In other words, segmentation of the handover command message over more than two GSM air interface messages can have a significantly detrimental, and unacceptable, impact on handover performance.

In the situation of handover from GSM to UTRAN, the GSM handover command message encompasses a RRC Handover to UTRAN command message. The RRC Handover to UTRAN command message includes the details of the UTRA radio resources to be used in the UTRAN after handover. The RRC Handover to UTRAN command message includes a large number of parameters stored in respective information elements of the RRC Handover to UTRAN command message. The size of the RRC Handover to UTRAN command message depends on the actual content of these parameters, and can be as long as one hundred to two hundred octets. When the RRC Handover to UTRAN command message is so large, it obviously cannot fit within a non-segmented GSM air interface message, with the result that the RRC Handover to UTRAN command message must be segmented.

Various techniques have been utilized as attempts to reduced the size of the handover command message, and thus to avoid segmentation of the handover command message. As a first example technique is preconfiguration. There are two basic types of preconfiguration. A first type of preconfiguration is pre-defined configuration. In pre-defined configuration, a network can prepare and download one or more radio configurations to a mobile terminal. Such a pre-defined radio configuration comprises a large number of radio bearer parameters, transport channel parameters, and physical channel parameters. Prior to RAT handover, the UTRAN inquires which configurations are stored in the mobile terminal. In case the mobile terminal has suitable pre-defined configurations stored thereat, the UTRAN can refer to a stored configuration and then only needs to signal a few additional parameters to be used in addition to the stored parameters associated with the pre-defined configuration.

A second type of preconfiguration is default parameter configuration. In default parameter configuration, a number of parameters have default values which are specified in a standard, such as RRC Protocol Specification TS 25.331. The default parameter configuration can be utilized in a similar manner, but since it does not need to be downloaded, it can be used more easily.

As a second example technique for reducing length of the handover command message, several initially non-essential parameters can be omitted from the handover command message. It is assumed by this technique, however, that the corresponding functionality of these parameters need not be configured immediately upon handover.

As a third example technique, for some of the parameters transferred when using preconfiguation, the use of smaller value ranges for the parameters can be predetermined. In other words, the sizes of certain information elements in the handover command message is reduced by reserving a subrange of the information element parameter values for exclusive use by the mobile terminal which is performing the inter-RAT handover. An explanation of this third technique is provided in U.S. patent application Ser. No. 09/483,743, filed Jan. 17, 2000, entitled "Method and System For Improving The Performance of Inter-System Handovers", which is incorporated herein by reference in its entirety. This third technique helps to reduce further the size of the handover command message, although sometimes there is a slight performance degradation.

Despite the various techniques that have been used to reduce the size of handover command messages, the handover command message nevertheless approaches the limit imposed by the space available in a non-segmented GSM air interface message. Unless other mechanisms are defined, hardly any space is left in the RRC Handover to UTRAN command message to facilitate the inclusion of further parameters.

One of the parameters that needs to be included in the RRC Handover to UTRAN command message, when using preconfiguration, is a parameter having an information element known as "Default DPCH Offset Value". Persons skilled in the art will appreciate that DPCH refers to a dedicated physical channel which corresponds to a spreading code (see, e.g., 3GPP TS 25.211, v.3.2.0 "Physical Channels and Mapping of Transport Channels Onto Physical Channels (FDD)" or 3GPP TS 25.221, v.3.2.0 "Physical Channels and Mapping of Transport Channels Onto Physical Channels (TDD)"). The Default DPCH Offset Value parameter is used to distribute evenly the processing and transmission load of different mobile terminals over time. The time interval over which the distribution is performed is 80 milliseconds, which corresponds with the maximum transmission time interval (TTI). Adding the Default DPCH Offset Value parameter to the RRC Handover to UTRAN command message would introduce an additional ten bits (600 steps of 512 chips). As indicated before, this is undesirable since the size of the RRC Handover to UTRAN command message is already close to the limit for a non-segmented GSM air interface message.

What is needed, therefore, and an object of the present invention, is a technique for facilitating transmission of additional parameters in a handover command message in conjunction with inter-RAT handover without appreciably lengthening the handover command message.

BRIEF SUMMARY

The present invention pertains to a dual mode mobile terminal (MT) which is capable of communicating (e.g., with a core network) either via a first radio access network having a first type radio access technology or a second radio access network having a second type radio access technology, as well as to networks and nodes of such networks which cater to user equipment units (UE) capable of dual mode operation and to methods of operating such mobile terminals (MTs), networks, and nodes.

When the first radio access network is serving the mobile terminal (MT) in a first mode of operation, the mobile terminal (MT) monitors transmissions from the second radio access network. When conditions warrant, a network node prepares a radio access technology (RAT) handover message for transmission to the equipment unit (UE) in conjunction with handover of the mobile terminal (MT) from the first radio access network to the second radio access network, and in conjunction with an associated change of operation mode of the mobile terminal (MT) from the first mode to the second mode. In one example, non-limiting implementation, the first network (and hence the first mode) is a GSM network and the second network (and hence the second mode) is a UTRAN network (UMTS Terrestrial Radio Access Network (UTRAN) of a universal mobile telecommunications (UMTS) system).

The radio access technology handover message includes a first information element representative of a first parameter from which a value of a second parameter can be derived so that the second parameter need not be included as a separate information element in the radio access technology handover message. Not including the second parameter as a separate element in the radio access technology handover message facilitates non-segmentation of the radio access technology handover message.

In one aspect, the radio access technology handover message is a RRC Handover to UTRAN message which is transmitted to the mobile terminal (MT). The mobile terminal (MT) derives the second parameter from the first parameter. In one example, non-limiting mode, the first parameter is a Serving-Radio Network Temporary Identifier (S-RNTI 2) and the second parameter is an information element which facilitates distribution of load and transmission of traffic in the radio access network (e.g., a Default DPCH Offset Value). In one example implementation the second parameter (P2, e.g., the Default DPCH Offset Value) is derived from the first parameter (P1, e.g., S-RNTI 2) using the Expression P2=(P1 mod C1)*C2, wherein C1 is a first constant and C2 is a second constant. In a specific example for FDD, C1 may have a value such as 599 or 600, for example, while C2 may have a value such as 512, for example. In a specific example for TDD, C1 may have a value such as 7, for example, while C2 may have a value such as 1, for example.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
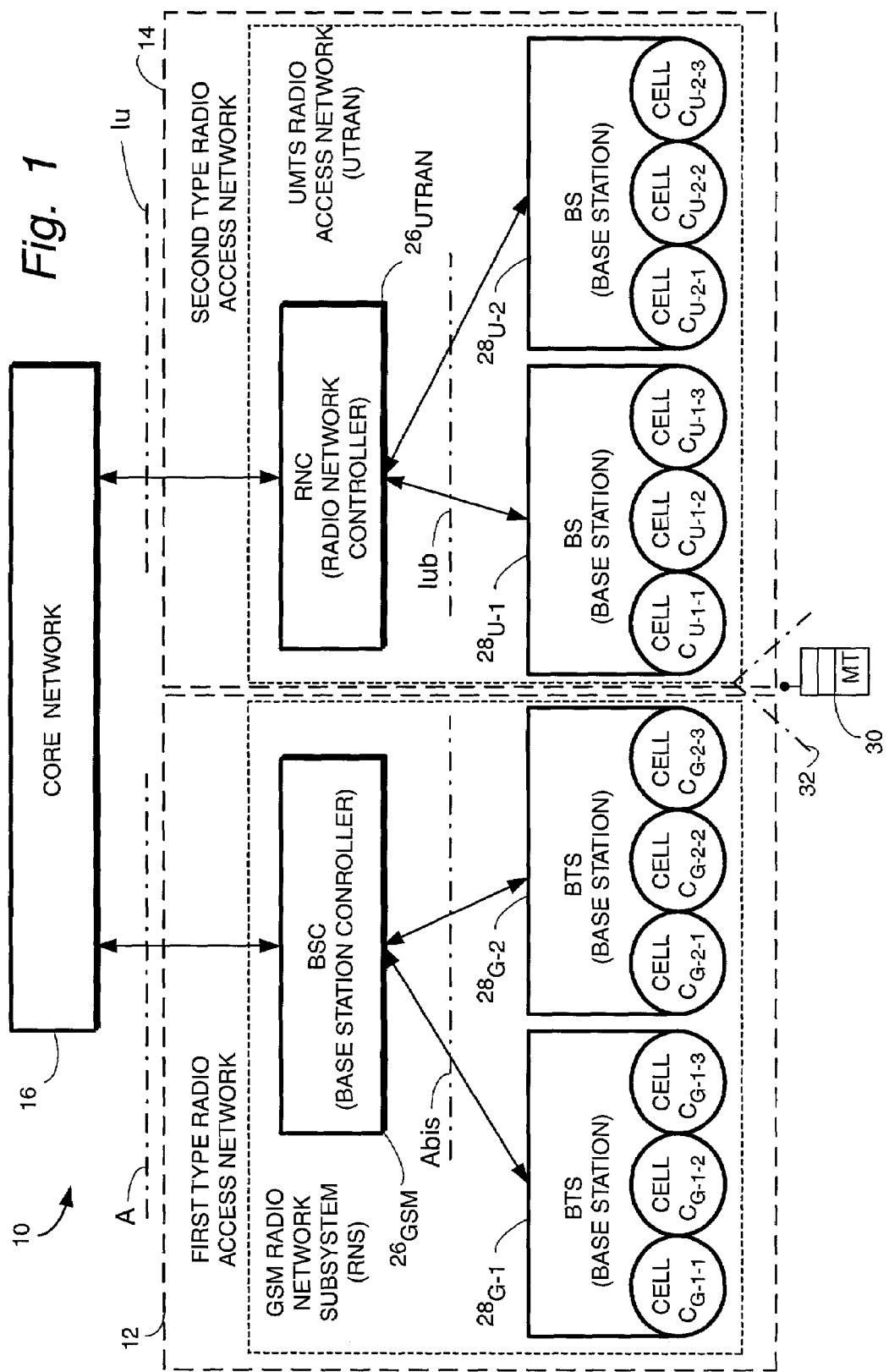
FIG. 1 is a diagrammatic view of a telecommunications system operating in conjunction with both a first radio access network having a first type radio access technology and a second radio access network having a second type radio access technology.

FIG. 1 shows a telecommunications system 10 operating in conjunction with both a first radio access network 12 having a first type radio access technology and a second radio access network 14 having a second type radio access technology. In the non-limiting example shown in FIG. 1, the first radio access network 12 uses GSM radio access technology, while the second radio access network 14 uses UTRAN radio access technology. Both first radio access network 12 and second radio access network 14 are connected to an external core network 16, such may be (for example) the Public Switched Telephone Network (PSTN) and/or the Integrated Services Digital Network (ISDN).

The core network 16 connects to the first radio access network 12 (e.g., the GSM radio access network) over an interface know as the A interface. The first radio access network 12 includes one or more base station controllers (BSCs) $26_{GSM}$, with each base station controller (BSC) $26_{GSM}$ controlling one or more base stations (BTSs) $28_G$. In the example shown in FIG. 1, base station controller (BSC) $26_{GSM}$ is connected across the Abis interface to two base stations, particularly base station (BTS) $28_{G-1}$ and base station (BTS) $28_{G-2}$. Each base station (BTS) $28_G$ is depicted in FIG. 1 as serving three cells C. Each cell C is represented by a circle proximate the respective base station. Thus, it will be appreciated by those skilled in the art that a base station may serve for communicating across the air interface for more than one cell, and that differing base stations may serve differing numbers of cells. The base station controllers (BSCs) $26_{GSM}$ controls radio resources and radio connectivity within a set of cells, e.g., the cells $C_G$ shown in FIG. 1. Each base station (BTS) $28_G$ handles the radio transmission and reception within one or more cells.

The core network 16 also connects to the second radio access network 14 (e.g., the UTRAN radio access network) over an interface know as the Iu interface. The second radio access network 14 includes one or more radio network controllers (RNCs) $26_U$. For sake of simplicity, the UTRAN 14 of FIG. 1 is shown with only one RNC node, although typically more than one such node is typically provided. The RNC node $26_U$ is connected to a plurality of base stations (BS) $28_U$. For example, and again for sake of simplicity, two base station nodes—base station (BS) $28_{U-1}$ and base station (BS) $28_{U-2}$—are shown connected to RNC $26_U$ over an interface known as the Iub Interface. It will again be appreciated that a different number of base stations can be served by an RNC, and that RNCs need not serve the same number of base stations. As in GSM network 12, in UTRAN network 14 for sake of simplicity each base station $28_U$ is shown as serving three cells (each such cell being labeled at least partially as $C_U$). In second radio access network (UTRAN network) 14, the radio network controller (RNC) $26_U$ controls radio resources and radio connectivity within a set of cells $C_U$, while the base stations (BS) $28_U$ handle the radio transmission and reception within one or more cells.

Figure 2:
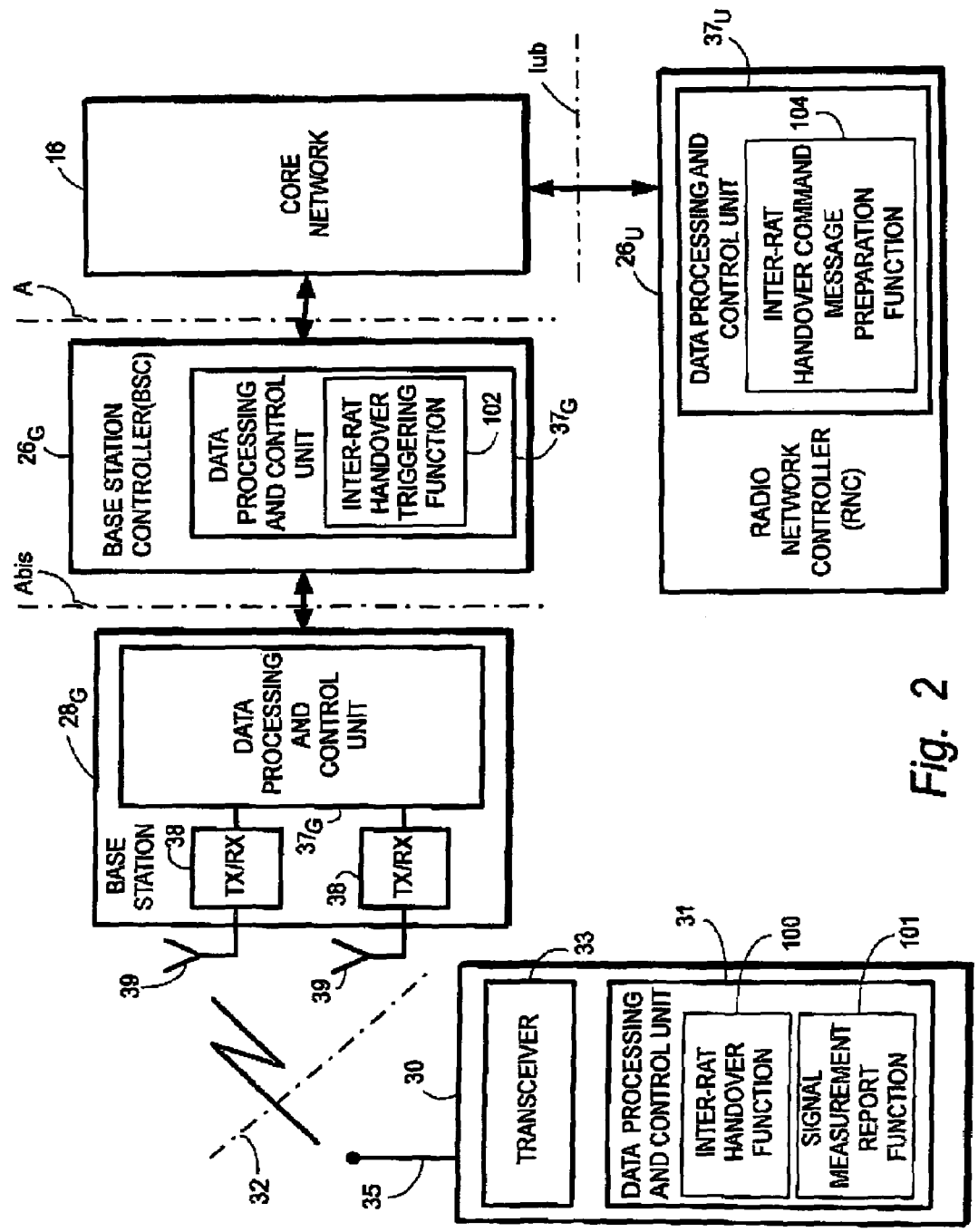
FIG. 2 is a simplified function block diagram showing certain example aspects of a representative mobile terminal and network nodes of FIG. 1 which are involved in an example inter-RAT handover.

Each of the aforementioned interfaces, including the A interface, the Abis interface, a radio interface 32, the Iu interface, and the Iub interface are shown by dash-dotted lines in FIG. 1 and FIG. 2.

A dual mode mobile terminal (MT), such as mobile terminal (MT) 30, is shown in FIG. 1 as being in radio communication with first radio access network (GSM network) 12 with an inter-RAT handover being imminent to second radio access network (UTRAN network) 14. It will be appreciated that in a GSM context such a mobile terminal is typically described as a "mobile station", while in a UTRAN context the mobile terminal is often called a user equipment unit (UE). As used herein, the term mobile terminal (MT) generically encompasses both the notion of a mobile station and the notion of a user equipment unit (UE). The mobile terminal (MT) 30 can be mobile devices such as mobile telephones ("cellular" telephones) and laptops with mobile termination, and thus can be, for example, portable, pocket, hand-held, computer-included, or car-mounted mobile devices which communicate voice and/or data with radio access network.

FIG. 2 shows selected general aspects of mobile terminal (MT) 30 and selected functionalities of nodes such as base station controller (BSC) $26_{GSM}$ and radio network controller (RNC) $26_U$. The mobile terminal (MT) 30 shown in FIG. 2 includes a data processing and control unit 31 for controlling various operations required by the mobile terminal (MT). The data processing and control unit 31 of mobile terminal (MT) 30 includes a mobile terminal inter-RAT handover function 100 and a signal measurement report function 101, the purposes of which are described in more detail subsequently. In addition, the data processing and control unit 31 provides control signals as well as data to a radio transceiver 33 connected to an antenna 35.

The example base station (BTS) $28_G$ shown in FIG. 2 includes a base station data processing and control unit $36_G$, which is connected to one or more base station transceivers (TX/RX) 38. Each base station transceiver (TX/RX) 38 is connected to a corresponding antenna 39, an appropriate one of which communicates over air interface 32 with mobile terminal (MT) 30.

The example base station controller (BSC) $26_G$ shown in FIG. 2 includes a BSC data processing and control unit $37_G$. Similarly, the example radio network controller (RNC) $26_U$ includes an RNC data processing and control unit $37_U$. The BSC data processing and control unit $37_G$ includes an inter-RAT handover triggering function 102; the RNC data processing and control unit $37_U$ includes a RAT handover command message preparation function 104. Any or all of mobile terminal inter-RAT handover function 100; inter-RAT handover triggering function 102; and RAT handover command message preparation function 104 may be implemented using individual hardware circuits, using software functioning in conjunction with a suitably programmed digital microprocessor or general purpose computer, using an application specific integrated circuit (ASIC), and/or using one or more digital signal processors (DSPs)

As mentioned above, mobile terminal (MT) 30 has a dual mode functionality, e.g., the capability to communicate with a first type of radio access technology network such as GSM network 12 and a second type of radio access technology network such UTRAN network 14. Described herein also are the networks themselves and nodes of such networks which cater to such dual mode mobile terminals.

In its various aspects, the present invention concerns one or more of the preparation, format, transmission, decoding, and use of a unique and compact handover command message which is utilized as part of an inter-RAT handover procedure. To illustrate such aspects, it is assumed in the situation of FIG. 1 that initially first radio access network (GSM network) 12 is handling radio communication with mobile terminal (MT) 30. This could mean that, for example, first radio access network (GSM network) 12 is currently responsible for paging mobile terminal (MT) 30 regarding any call (e.g., a call from the core network), or for determining whether mobile terminal (MT) 30 requests to establish a call (e.g., connection). Handling the radio communication with mobile terminal (MT) 30 can also mean that first radio access network (GSM network) 12 is currently supervising an existing call which involves mobile terminal (MT) 30. Further, it is assumed that mobile terminal (MT) 30 has the capability to monitor/measure, and does monitor/measure, the properties (e.g., signal strength) of certain channels broadcast by second radio access network (UTRAN network) 14.

Figure 3:
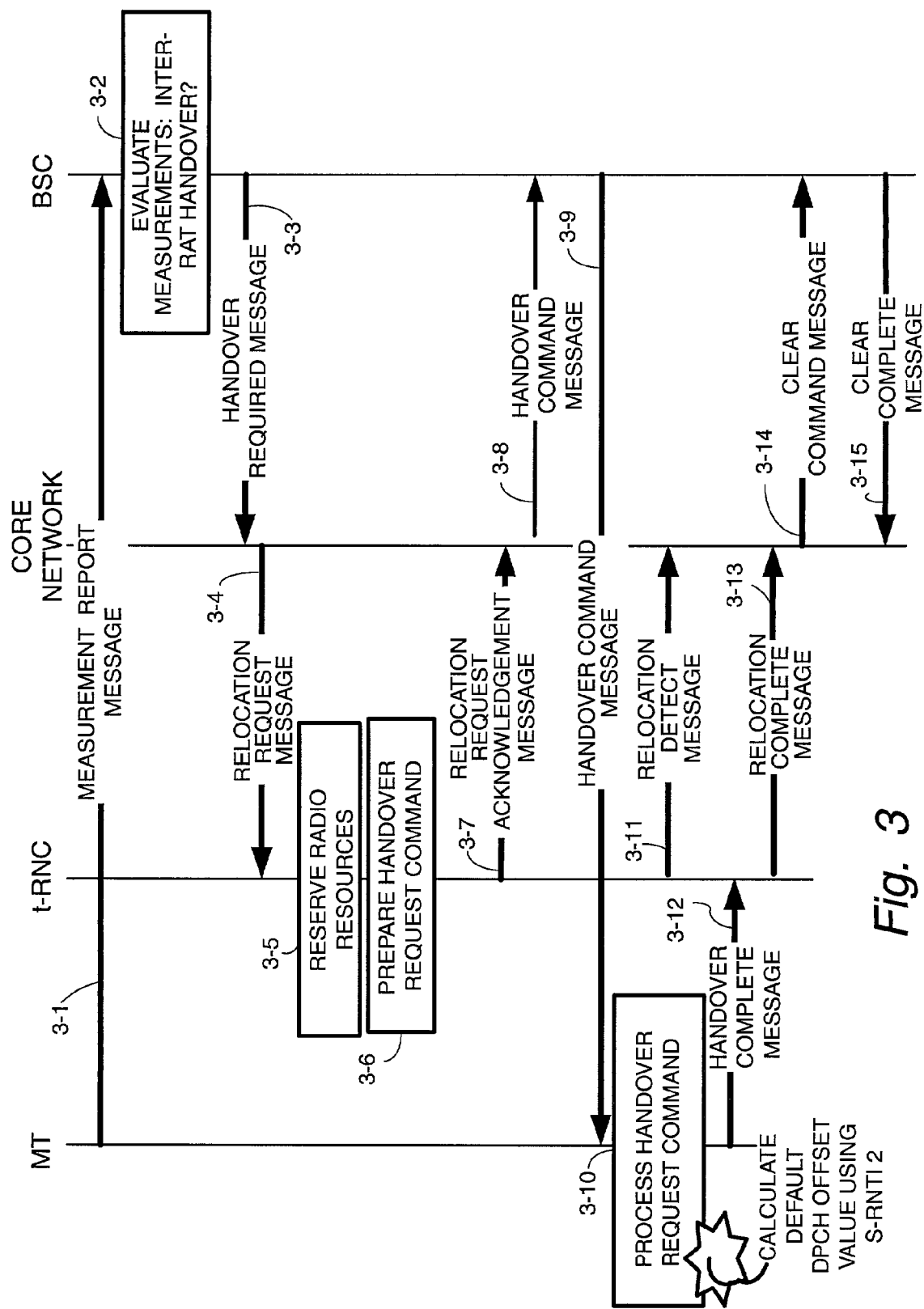
FIG. 3 is a diagrammatic view of example basic actions involved in an example inter-RAT handover of a mode of operation.

FIG. 3 depicts example basic actions involved in an example inter-RAT handover procedure of a representative mode of the present invention. Action 3-1 of the inter-RAT handover procedure of FIG. 3 shows a measurement report message being sent from mobile terminal (MT) 30 to base station controller (BSC) $26_{GSM}$. The measurement report message is "enhanced" in the sense that it includes not only measurements (of, e.g., signal strength) for selected channel(s) of first radio access network (GSM network) 12, but also measurements of selected channels for second radio access network (UTRAN network) 14. The measurement report message is based upon measurements made and reported by signal measurement report function 101 of mobile terminal (MT) 30.

Action 3-2 of the inter-RAT handover procedure of FIG. 3 depicts the inter-RAT handover triggering function 102 of base station controller (BSC) $26_{GSM}$ evaluating the measurements included in the measurement report message of action 3-1, and determining whether an inter-RAT handover is necessary. An inter-RAT handover can be initiated when the quality of the downlink radio connection with the first radio access network (GSM network) 12, as reported by the measurement report message of action 3-1, falls below a predetermined level. In the scenario shown in FIG. 3, it is assumed that, at action 3-2, the inter-RAT handover triggering function 102 of base station controller (BSC) $26_{GSM}$ determines that an inter-RAT handover is necessary, e.g., that an inter-RAT handover is desired to handover mobile terminal (MT) 30 from first radio access network (GSM network) 12 to second radio access network (UTRAN network) 14.

As a result of the determination of action 3-2 by inter-RAT handover triggering function 102 that an inter-RAT handover is desired, as action 3-3 base station controller (BSC) $26_{GSM}$ prepares and transmits a handover required message to core network 16. In response, the core network sends a relocation request message to the target RNC (t-RNC) as action 3-4. By the relocation request message of action 3-4, the core network 16 requests the t-RNC to reserve resources to accommodate the inter-RAT handover. The actual resource reservation is represented by action 3-5 in FIG. 3.

Figure 4:
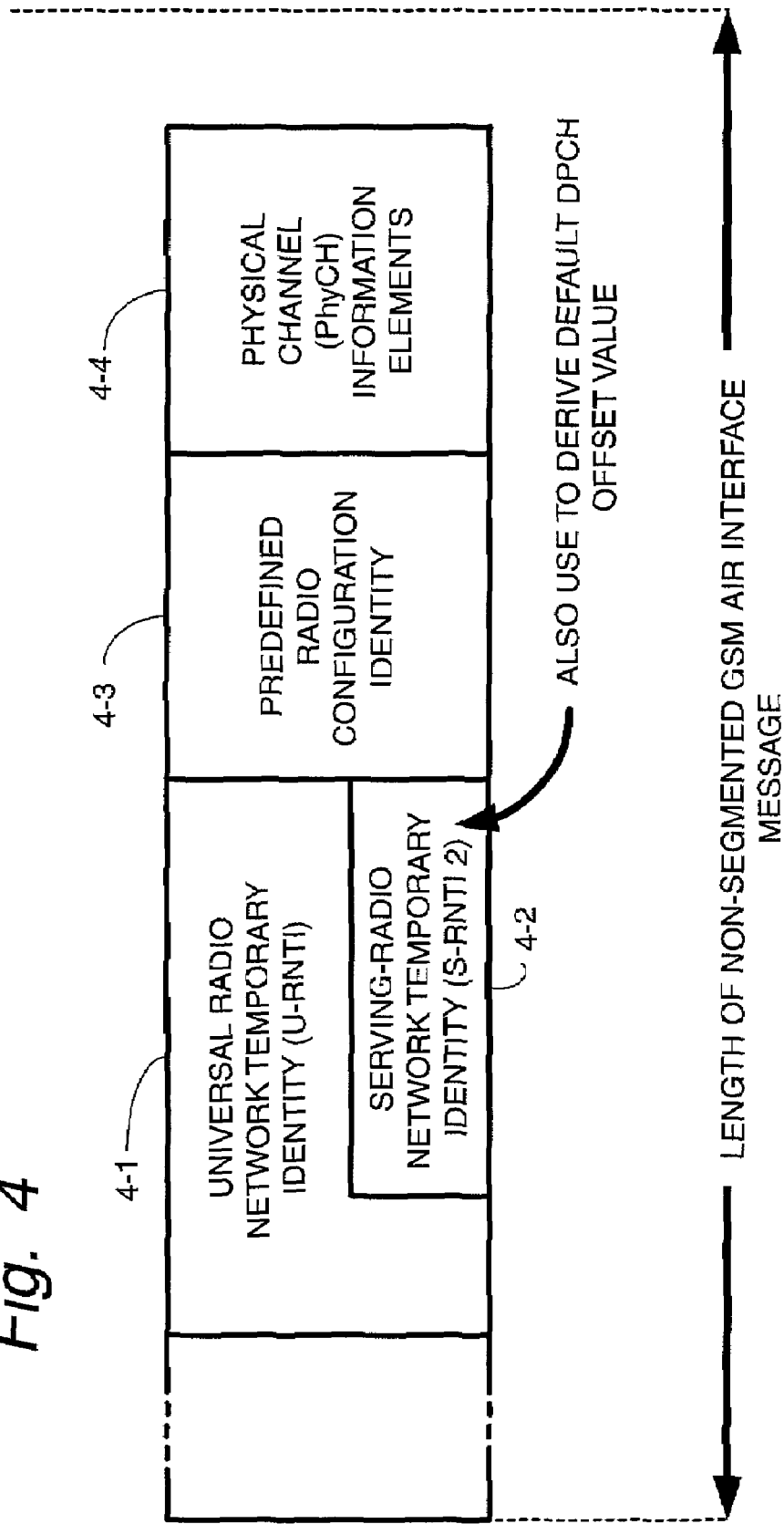
FIG. 4 is a diagrammatic view of a format of an example handover command message according to a non-limiting embodiment.

Furthermore, as action 3-6, the RAT handover command message preparation function 104 of t-RNC prepares an inter-RAT handover command message. FIG. 4 depicts a non-limiting, example format of at least selected portions of an example inter-RAT handover command message generated by the t-RNC as action 3-6. For example, the example inter-RAT handover command message of FIG. 4 includes a universal radio network temporary identifier (U-RNTI) information element 4-1; a serving-radio network temporary identifier (S-RNTI 2) information element 4-2 which is included as part of information element 4-1; a predefined radio configuration identity information element 4-3; and physical channel (PhyCH) information elements 4-4. The predefined radio configuration identity information element 4-3 indicates a predefined configuration of radio base station, traffic channel, and physical channel parameters to be used. The physical channel (PhyCH) information elements 4-4 include a scrambling code number. The particular serving-radio network temporary identifier utilized in the illustrated embodiment, i.g., S-RNTI 2, is a special version of the previously-utilized SRNTI that is used in the inter-RAT handover to UTRAN procedure. A smaller range of identity values is utilized for S-RNTI 2 in order to reduce the number of bits in the inter-RAT handover message.

The radio access technology handover message prepared as action 3-6 includes a first information element representative of a first parameter from which a value of a second parameter can be derived so that the second parameter need not be included as a separate information element in the inter-radio access technology handover message. Not including the second parameter as a separate element in the radio access technology handover message facilitates non-segmentation of the radio access technology handover message.

In particular, in the illustrated scenario in which the radio access technology handover message is a RRC Handover to UTRAN message, the second parameter of the RRC Handover to UTRAN command message is prepared so that the it can be derived by mobile terminal (MT) 30 from the first parameter of the RRC Handover to UTRAN command message. As shown in FIG. 4, the first parameter is the Serving-Radio Network Temporary Identifier (S-RNTI 2) of information element 4-2, and the second parameter is an information element which facilitates distribution of load and transmission of traffic in the radio access network (e.g., a Default DPCH Offset Value). In one example implementation the second parameter (P2, e.g., the Default DPCH Offset Value) is derived from the first parameter (P1, e.g., S-RNTI 2) using the Expression P2=(P1 mod C1)*C2, wherein C1 is a first constant and C2 is a second constant. In a specific example for FDD, C1 may have a value such as 599 or 600, for example, while C2 may have a value such as 512, for example. In a specific example for TDD, C1 may have a value such as 7, for example, while C2 may have a value such as 1, for example.

The handover command message as prepared as action 3-6 is included in a relocation request acknowledgment message sent by t-RNC to core network 16 as action 3-7. The relocation request acknowledgment message of action 3-7 thus serves to confirm the reservation of resources by the t-RNC, and to include the details of UTRA radio resources to be used after the inter-RAT handover.

Upon receiving the relocation request acknowledgment message of action 3-7, core network 16 next orders performance of the inter-RAT handover by sending a GSM handover command message to base station controller (BSC) $26_{GSM}$ as action 3-8. The GSM handover command message includes the details of the UTRA radio resources to be used after handover, since the GSM handover command message essentially includes the RRC Handover to UTRAN command message prepared as action 3-6.

As action 3-9, the base station controller (BSC) $26_{GSM}$ forwards the GSM handover command message received at action 3-8 to mobile terminal (MT) 30 over the air interface.

Advantageously, in view of the technique of the present invention, the RRC Handover to UTRAN command message of the present invention fits within a GSM handover command message that does not need to be segmented over the GSM air interface. Thus, action 3-9 includes transmission of the GSM handover command message over the GSM air interface to 30 over the GSM air interface to 30. The handover command message of action 3-9 includes the RRC Handover to UTRAN command message generated as action 3-6.

Action 3-10 of the inter-RAT handover procedure of FIG. 3 shows the mobile terminal inter-RAT handover function 100 of mobile terminal (MT) 30 processing the handover command message. Various sub-actions encompassed in action 3-10 and performed by the mobile terminal are described in 3GPP TS 25.331 v3.7.0 (2001–06), $3^{rd}$ Generation Partnership Project; Technical Specification Group Radio Access Network; RRC Protocol Specification (Release 1999), which is incorporated herein by reference in its entirety. Among such sub-actions are storing of certain parameters transmitted in the handover command message of action 3-9; initializing of certain variables, counters, and timers; and (depending on mode) initiating radio bearer and transport channel configuration.

As part of the processing of action 3-10, the mobile terminal inter-RAT handover function 100 derives or calculates the Default DPCH Offset Value to be used in the UTRAN by mobile terminal (MT) 30 from the value of the S-RNTI 2 parameter included in the handover command message of action 3-9. In the illustrated example implementation, the Default DPCH Offset Value is calculated from the S-RNTI 2 using Expression 1 provided above.

When the radio access network 14 detects the mobile terminal 30, the radio access network 14 knows that the mobile terminal 30 has made the switch or handover from the first network (GSM network 12) to the second network (UTRAN network 14). Accordingly, as action 3-11 the t-RNC sends a relocation detect message to the core network 16. This indication may be used to initiate release of the resources related to the old network.

Upon successful completion of the inter-RAT handover, as action 3-12 mobile terminal (MT) 30 also sends a handover to UTRAN complete message, via the air interface, to the t-RNC. In response, as action 3-13 the t-RNC sends a relocation complete message to core network 16. Upon receipt of the relocation complete message of action 3-13, the core network authorizes release of the GSM radio connection. Release of the GSM radio connection is realized by a clear command sent as action 3-14 from core network 16 to base station controller (BSC) $26_{GSM}$, which is followed by a clear complete message sent from base station controller (BSC) $26_{GSM}$ to core network 16 as action 3-15.

Thus, when conditions warrant, a network node of the second radio access network prepares a radio access technology (RAT) handover message for transmission to the mobile terminal in conjunction with handover of the mobile terminal (MT) from the first radio access network to the second radio access network, and for an associated change of operation mode of the mobile terminal (MT) from the first mode to the second mode.

As described above, in accordance with the present invention, instead of including the second parameter in the handover command message, a rule/algorithm is defined for determining the value of the second parameter (not included as a separate information element in the handover command message) from a first parameter which is included in the handover command message. In the illustrated scenario, the Default DPCH Offset Value is related to the SRNTI 2 parameter, the SRNTI 2 parameter always being included in the RRC Handover to UTRAN command message.

SRNTI 2 is a suitable parameter from which to derive the non-included second parameter, since the SRNTI 2 parameter is an information element to which no further behavior is associated. That is, SRNTI 2 is merely an identity, the value of which can normally be arbitrarily assigned without having any impact, e.g., on behavior of the mobile terminal or system performance or the like. Thus, the SRNTI is suitable to couple with the second parameter, e.g., the Default DPCH offset value, and can be allocated taking the load distribution into account without having any side effects.

The solution of the present invention makes it possible from UTRAN to evenly distribute the loading by assigning SRNTI 2 accordingly, If, however, a minor portion of the load is generated by the mobile terminals that have been handed over from GSM, UTRAN may not need to take load distribution into account when assigning the SRNTI 2 parameter.

Advantageously, the present invention makes it possible to distribute the load and transmission for different mobile terminals without increasing the size of the handover command message message (e.g., the RRC Handover to UTRAN command message). As a result, it is possible to transfer the handover command message of the present invention within a non-segmented GSM air interface. Beneficially, as a result the performance of the inter-RAT handover is not compromised.

The present invention applies both to the UTRA-FDD and the UTRA-TDD modes of the UTRAN standard as defined by the Third Generation Partnership Project (3GPP).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A mobile terminal which is in radio communications with a radio access network of a telecommunications system, the mobile terminal comprising:
   a receiver/transmitter unit which is in established radio communication with a first radio access network having a first type radio access network technology and which monitors transmissions from a second radio access network having a second type radio access network technology;
   a network handover function which processes a radio access technology (RAT) handover message transmitted to the equipment unit (UE), the radio access technology handover message being transmitted to the mobile terminal in conjunction with handover of the mobile terminal from the first radio access network to the second radio access network, wherein the network handover function processes the radio access technology handover message by using a first information element included in the radio access technology handover message and representative of a first parameter to derive a value of a second parameter so that the second parameter is not included as a separate information element in the radio access technology handover message, and wherein the second parameter is a Default DPCH Offset Value.

2. The mobile terminal of claim 1, wherein the first parameter is a Serving-Radio Network Temporary Identifier and the second parameter is a parameter which facilitates distribution of load and transmission of traffic in the radio access network.

3. The mobile terminal of claim 1, wherein the second parameter (P2) is derived from the first parameter (P1) using an Expression P2=(P1 mod C1) * C2, wherein C1 is a first constant and C2 is a second constant.

4. The mobile terminal of claim 3, wherein C1 has a value of one of 599 and 600, and C2 has a value of 512.

5. The mobile terminal of claim 2, wherein the first parameter is a parameter to which no further behavior is associated.

6. The mobile terminal of claim 1, wherein the radio access technology handover message is a RRC Handover to UTRAN command.

7. The mobile terminal of claim 1, wherein not including the second parameter in the radio access technology handover message facilitates non-segmentation of the radio access technology handover message.

8. The mobile terminal of claim 1, wherein the node is a node of the first radio access network.

9. The mobile terminal of claim 1, wherein the first radio access network is a Global System for Mobile communications (GSM) network and the second radio access network is a UMTS Terrestrial Radio Access network (UTRAN).

10. A method of operating a mobile terminal comprising:
transmitting measurements pertinent to whether the mobile terminal should be handed over from a first radio access network of having a first type radio access technology to a second radio access network of having a second type radio access technology;
processing a radio access technology (RAT) handover message to obtain a first information element representative of a first parameter;
deriving from the first parameter a value of a second parameter pertinent to inter-network handover, the second parameter not being included as a separate information element in the radio access technology handover message;
wherein the second parameter is a Default DPCH Offset Value.

11. The method of claim 10, further comprising, at the mobile terminal, deriving the second parameter from the first parameter.

12. The method of claim 11, wherein the first parameter is a Serving-Radio Network Temporary Identifier and the second parameter is a parameter which facilitates distribution of load and transmission of traffic in the radio access network.

13. A method of operating a mobile terminal comprising:
transmitting measurements pertinent to whether the mobile terminal should be handed over from a first radio access network of having a first type radio access technology to a second radio access network of having a second type radio access technology;
processing a radio access technology (RAT) handover message to obtain a first information element representative of a first parameter;
deriving from the first parameter a value of second parameter pertinent to inter-network handover, the second parameter not being included as a separate information element in the radio access technology message.
wherein the second parameter (P2) is derived from the first parameter (P1) using an Expression P2=(P1 mod C1) * C2, wherein C1 is a first constant and C2 is a second constant.

14. The method of claim 13, wherein C1 has a value of one of 599 and 600, and C2 has a value of 512.

15. The method of claim 10, wherein the first parameter is a parameter to which no further behavior is associated.

16. The method of claim 10, wherein the radio access technology handover message is a RRC Handover to UTRAN command.

17. The method of claim 10, wherein not including the second parameter in the radio access technology handover message facilitates non-segmentation of the radio access technology handover message.

* * * * *